United States Patent [19]
Brockway

[11] Patent Number: 5,358,355
[45] Date of Patent: Oct. 25, 1994

[54] COMPACTION WHEEL CLEAT

[75] Inventor: Robert J. Brockway, Milwaukee, Wis.

[73] Assignee: Terra Environmental Group Inc., Caledonia, Wis.

[21] Appl. No.: 52,120

[22] Filed: Apr. 23, 1993

[51] Int. Cl.⁵ ........................ B60B 15/02; E01C 19/25
[52] U.S. Cl. ........................................ 404/121; 301/43
[58] Field of Search ................... 404/90, 121, 124; 172/122, 540, 554; 301/43, 44.1; D15/28, 29

[56] References Cited

U.S. PATENT DOCUMENTS

| | | | |
|---|---|---|---|
| 1,011,001 | 12/1911 | Wright | 404/121 X |
| 3,687,023 | 8/1972 | Moser et al. | |
| 3,823,983 | 7/1974 | Peterson | 404/124 X |
| 3,891,341 | 6/1975 | Trainor et al. | 404/124 X |
| 4,530,620 | 7/1985 | McCartney | 404/121 |
| 4,668,122 | 5/1987 | Riddle . | |
| 4,919,566 | 4/1990 | Caron et al. . | |

Primary Examiner—Ramon S. Britts
Assistant Examiner—James A. Lisehora
Attorney, Agent, or Firm—Harold C. Knecht, III

[57] ABSTRACT

A cleat for mounting onto the working face of a wheel of a compaction machine. The cleat has a cutting face, two ends, two side faces and a bottom face. Each of the side faces is located on either side of the cutting face and slope downward toward the bottom face and generally toward opposite ends of the cleat.

17 Claims, 4 Drawing Sheets

COMPACTION WHEEL CLEAT

FIELD OF THE INVENTION

The present invention relates to cleats mounted on the wheels of compaction machines used to demolish and compact waste material.

BACKGROUND OF THE INVENTION

Compaction machines are used to compact landfill sites, garbage dumps and other such locations. These compaction machines typically have four large wheels made of steel with each wheel having a rim or outer wrapper about ½ inch to 1⅛ inches thick. The outer wrapper has a working face for contacting the surface of tile area, or bed of material, to be compacted. Inverted V-shaped cleats are usually mounted on each of the wheels. Each of these cleats have a cutting face, which is typically relatively flat, at the apex of the cleat and a base for being mounted on the working face. U.S. Pat. Nos. 4,668,122 and 4,919,566 disclose such cleats. These cleats are typically staggered around the periphery of the outer wrappers and generally mounted transversely on the working face of each wheel, that is with the longitudinal axis of each cleat being generally parallel to the axis of rotation of the wheels. As the machine is driven over the bed of material to be compacted, tile cleats sink into the waste material until the working face of tile wheels come in contact with the bed surface. Repeated passes over the area to be compacted are intended to demolish and compact the waste material forming the compaction bed.

The inverted V-shape of prior cleats is intended to provide a self cleaning action to help prevent refuse and other material from sticking to each cleat and clogging up the wheels. The effectiveness of the machine in compacting the refuse material decreases when the wheels get clogged up with material. While prior inverted V-shaped cleats have some self cleaning capabilities, there is still a need for a better cleat design that is even more likely to prevent refuse and other material from sticking to it and thereby clog up the working face of the wheels.

The cutting face of prior inverted V-shape cleats is intended to help demolish the waste material into smaller pieces. Smaller pieces of waste material can be more effectively compacted than larger pieces. While a number of prior cleats have cutting faces which may facilitate demolishing waste material into smaller pieces, there is a need for a better cleat design that more effectively demolishes waste material into smaller pieces.

Landfills, garbage dumps and the like can be very high with sloped faces. Compaction machines are often required to travel horizontally across these sloped faces. The compaction machine should be able to travel in this manner without sliding down the sloped face. Cleats have been mounted to the working face of the driving wheels in a number of patterns in an effort to stabilize the machine as it travels across the sloping face. While some cleat patterns have tended to stabilize these machines, there is a need for even better stabilization. In addition, some of these cleat patterns are known to become clogged up with waste material.

Compaction machines are used to compact a wide variety of materials. Some of these materials can be very abrasive. Prior cleats have been known to wear such that their cutting faces become rounded, thereby reducing the effectiveness of the cleat in demolishing and the machine in compacting the material. Therefore, there is also a need for a cleat which is more likely to retain its effectiveness in demolishing waste material for a longer period of time.

SUMMARY OF THE INVENTION

The present invention is directed to a cleat for mounting on the working face of compaction machine wheel rims or outer wrappers which improves the compacting ability of the machine. This invention is also directed to a pattern for mounting the present cleats onto the working face of the outer wrappers; the combination of which enables the compaction machine to compact waste materials more efficiently and thoroughly while at the same time providing the machine additional stability while it travels horizontally across a sloping face of a bed of material to be compacted.

The cleats of the present invention have a cutting face at the apex of the cleat, two ends, two side faces located on either side of the cutting face, and a bottom face. Each of the side faces slope downward from the cutting face toward the bottom face and generally toward opposite ends of the cleat. Preferably, the major axis of the cutting face is skewed relative to the major axis of the bottom face giving the cleat a generally twisted inverted wedge or V-shape appearance. With this design, it is believed that waste materials are less likely to stick to the present cleats, and therefore, the working face of the compaction machine wheels are less likely to become clogged with such materials.

In a preferred embodiment of the present cleat, the cutting face includes at least two puncture points or prongs which protrude therefrom. These puncture points tend to hold the refuse material while the weight of the machine forces the cutting face and side faces through the material twisting the material apart into smaller pieces. Dead air space within the bed of material is more likely to be removed when smaller pieces of material are being compacted. Less dead air space equates to a more efficient and economical use of a given site. The cutting face of prior cleats become rounded and blunt, thereby allowing refuse material to work its way around the cleat and reducing the effectiveness of the compaction machine. The cutting face of this embodiment of the present cleat is more likely to maintain its effectiveness for a longer period of use.

The cleats are preferably mounted in rows on the working face of the compaction machine wheels. In one embodiment, the present cleats are mounted across the working face along a diagonal from one side of the wheel to the other, with the major or longitudinal axis of the cutting face being generally parallel to the axis of rotation of the wheel. A left hand and a right hand cleat, which are mirror images of each other, are mounted on the wheels on opposite sides of the compaction machine. For the pair of front wheels and the pair of rear wheels, the cleats are mounted in generally mirror image diagonal rows (i.e., in general chevron patterns). Preferably, tile front and rear chevron patterns point in the forward traveling direction of tile machine. With left and right hand cleats of the present invention mounted in this pattern, it is believed that waste material under each wheel is forced downward and inward toward the center of the compaction machine when tile machine moves forward and is forced downward and outward when the machine is in reverse. By traveling back and forth over its own tracks, this inward and outward movement of the material helps to force out dead air space and thereby increase the density of material in the bed. In addition, mounting tile present cleats in such a chevron pattern provides traction and additional stability as the compaction machine travels horizontally across a sloping face of, for example, a landfill site.

In another embodiment, alternating rows of left and right hand cleats are mounted to the working face of each wheel in the same diagonal pattern as described above to produce a general chevron pattern. With the cleats mounted in this manner, it is believed that tile inward and outward movement of the waste material as described above will occur for each wheel, in either direction of travel. The above and other objectives, features and advantages of the present invention will become apparent upon consideration of the detailed description and appended drawings.

DETAILED DESCRIPTION OF THE DRAWINGS

Figure 1:
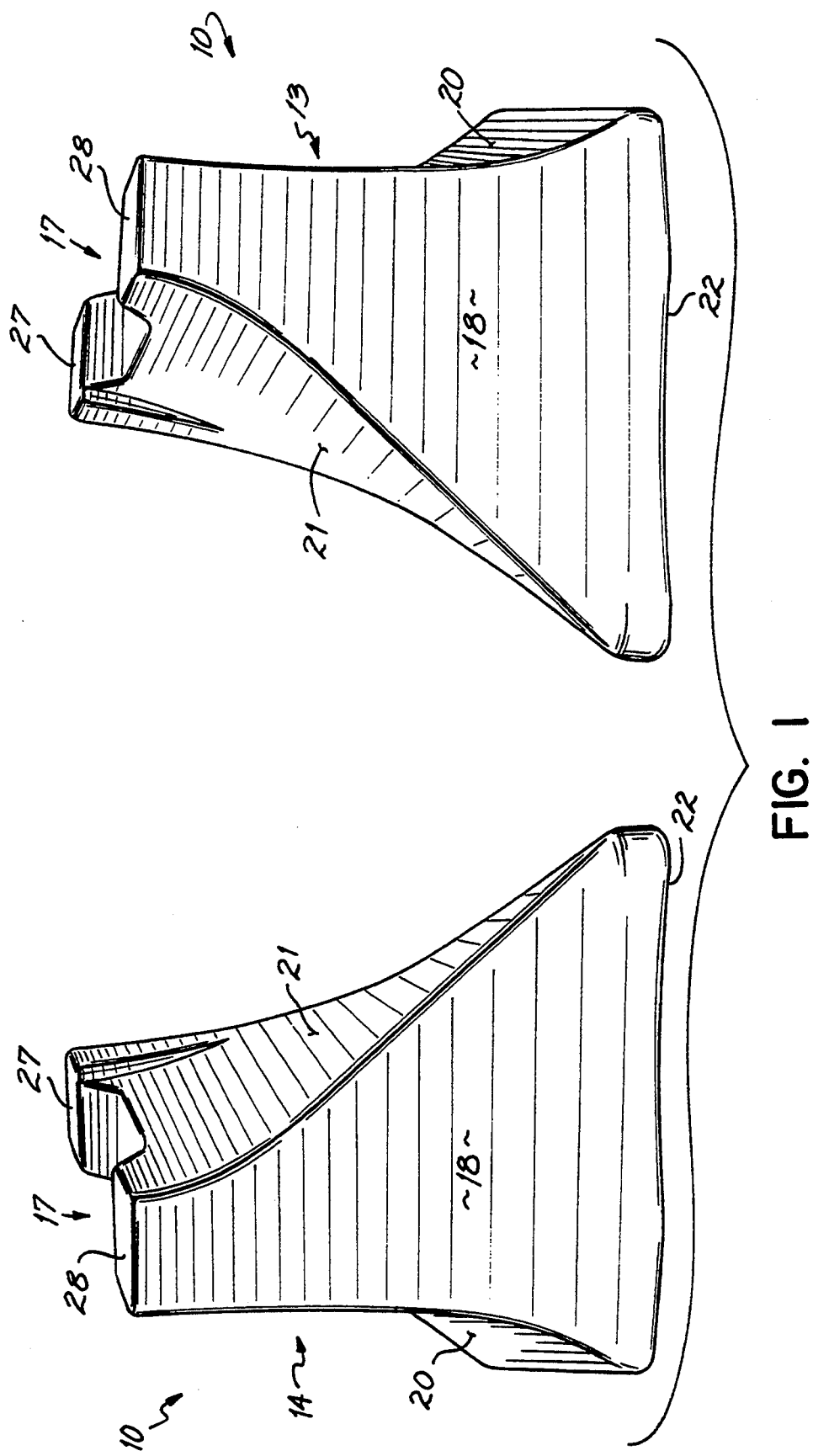
FIG. 1 is a perspective end view of a left and right hand cleat according to the present invention.

Referring to FIG. 1, a plurality of cleats 10 according to the present invention are typically intended to be mounted on the wheels of compaction machines (not shown) to aid their use in compacting landfill sites, garbage dumps, and the like. See U.S. Pat. No. 3,687,023, which is incorporated by reference in its entirety herein, for an example of a compaction machine. These cleats 10 preferably come in mirror image pairs, often referred to as left and right hand cleats 13 and 14, respectively. Because the cleats 13, 14 are generally mirror images of each other, only the right hand cleat 14 will be described in any detail hereafter. Thus, any numbers used to describe particular structure on the right hand cleat 14 will apply equally to similar structure on the left hand cleat 13.

Referring to FIGS. 1-4, the right hand cleat 14 includes a cutting face 17 at the apex of the cleat 14, opposite end faces or ends 18, 19, opposite side faces 20, 21 located on either side of the cutting face 17, and a bottom face 22. The bottom lace 22 preferably has a generally rhomboid shape, with a cavity 25 formed therein. The cavity 25 reduces the weight of the cleat 14. Each of the side faces 20, 21 slope downward from the cutting face 17 toward the bottom face 22 and generally toward opposite ends 18, 19, respectively, as depicted by arrows 30 and 31, respectively. The major axis 23 of the cutting face 17 is skewed at an angle $A_1$ relative to the major axis 24 of the bottom face 22 giving the cleat 14 a generally twisted inverted wedge or V-shape appearance. Angle $A_1$ is preferably in the range of about 20° to about 25°. The cutting face 17 also preferably includes at least two raised areas 27, 28 located on either end of the cutting face 17. These raised areas 27, 28 act as puncture points or prongs which tend to puncture and hold refuse material while the weight of the compaction machine forces the cutting face 17 and side faces 20, 21 through the material twisting the material apart into smaller pieces (i.e., demolishing the material).

Figure 5:
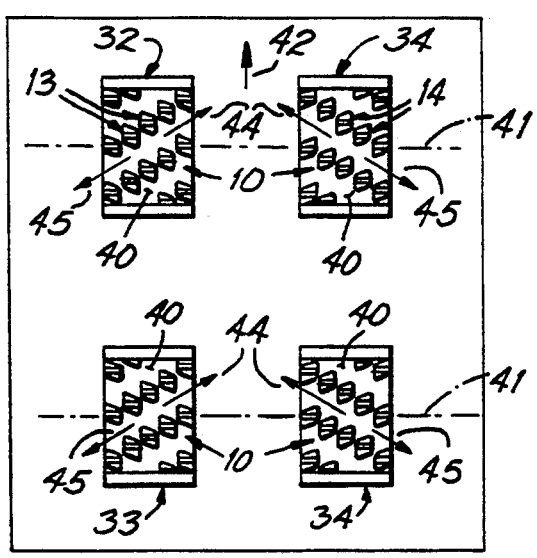
FIG. 5 is a diagrammatic top view of a cleat pattern on tile wheels of a four wheel compaction machine.
Figure 6:
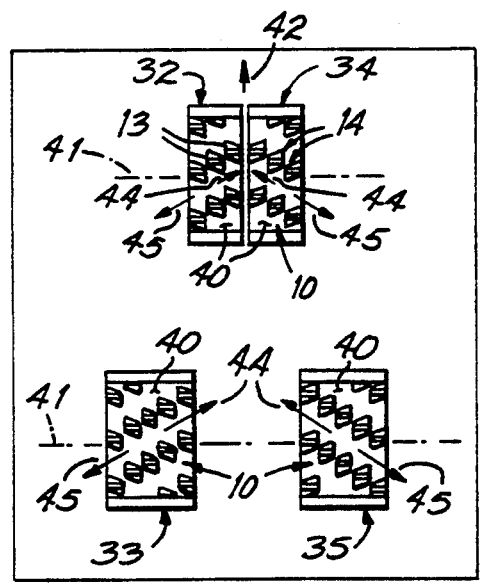
FIG. 6 is a diagrammatic top view of the cleat pattern shown in FIG. 5 as adapted for the wheels of a tricycle type compaction machine.
Figure 2:
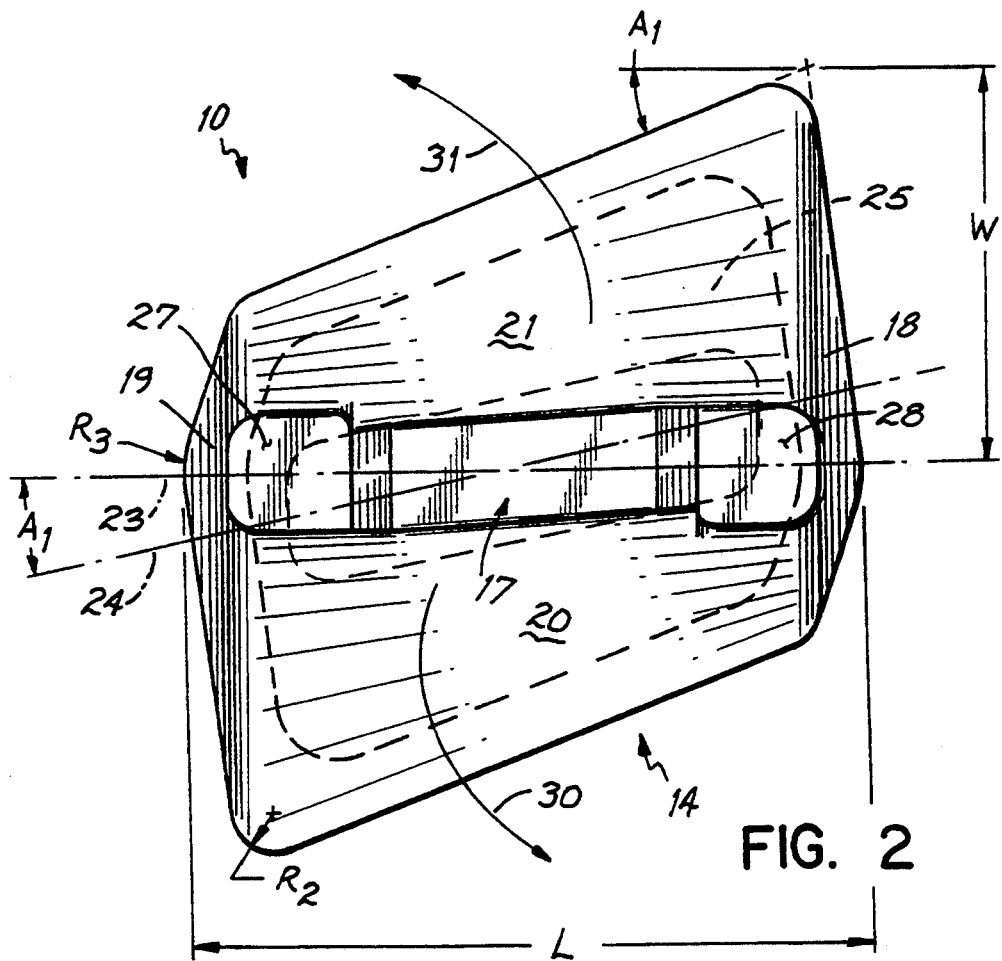
FIG. 2 is a top view of the right hand cleat of FIG. 1.
Figure 3:
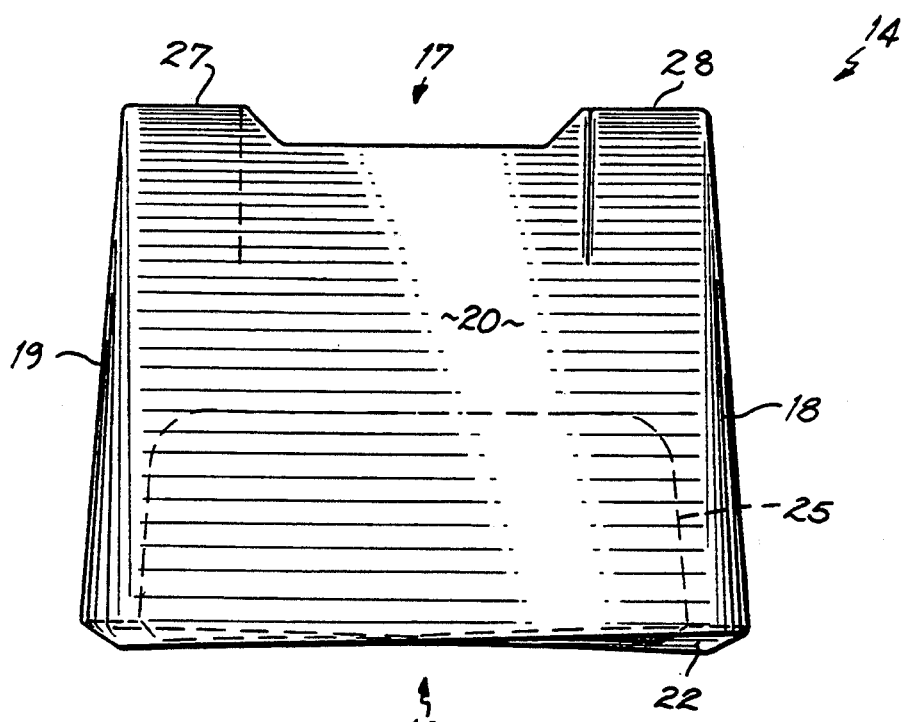
FIG. 3 is a side view of tile right hand cleat of FIG. 1.
Figure 4:
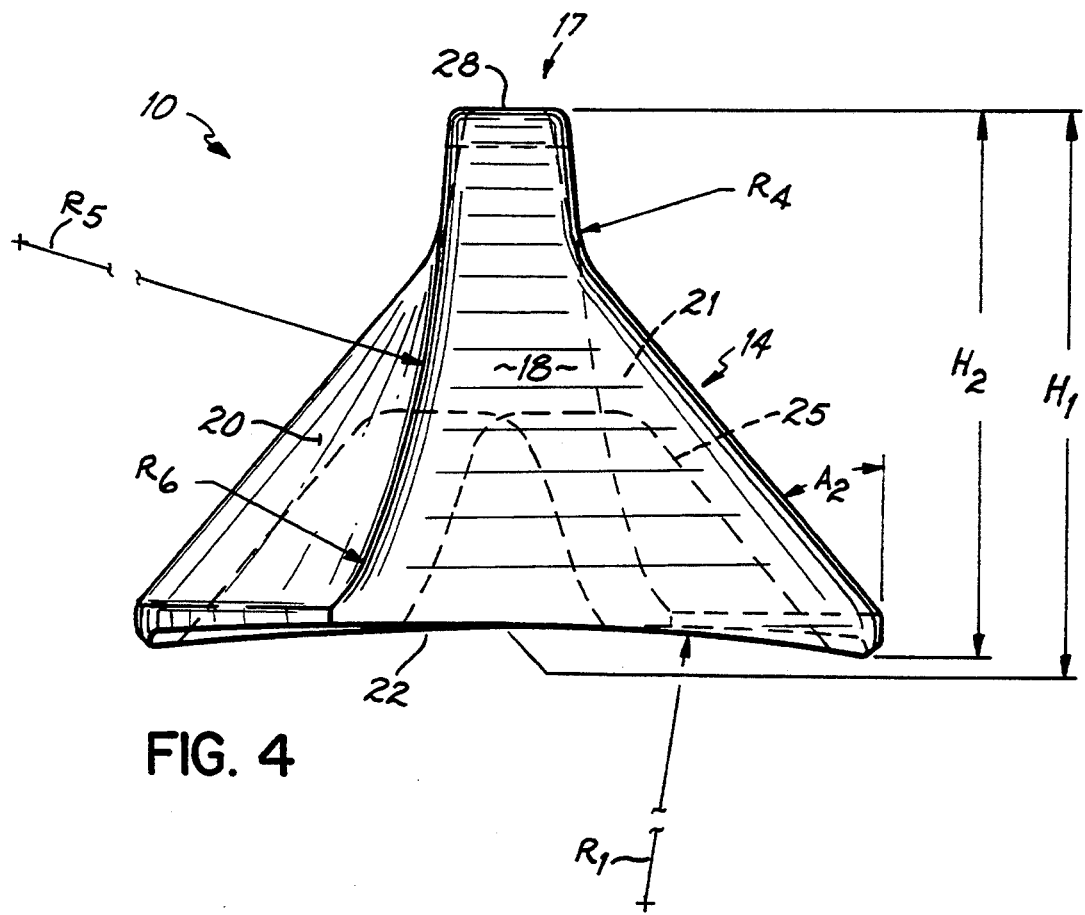
FIG. 4 is an end view of the right hand cleat of FIG. 1.
Figure 7:
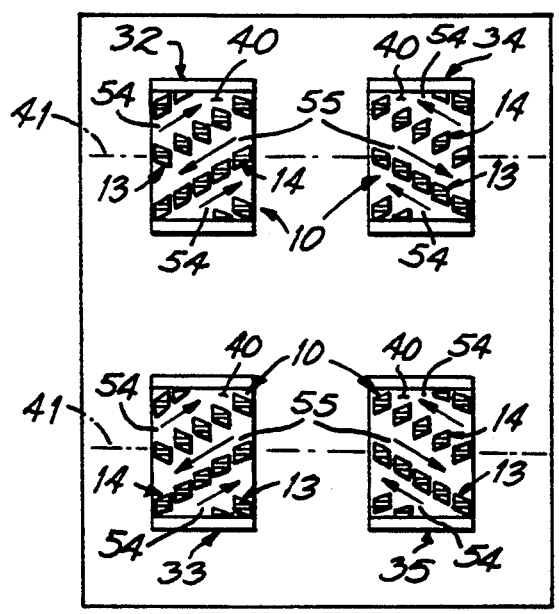
FIG. 7 is a diagrammatic top view of an alternative cleat pattern for the wheels of a four wheel compaction machine.

Referring to FIGS. 5-7, compaction machines (not shown) typically have a front and a rear left side wheel 32, 33, and a front and rear right side wheel 34, 35, respectively. This is often true even with three wheel or tricycle type compaction machines (See FIG. 6), since the front wheel is usually two wheels 32, 34 mounted next to each other. Each wheel 32-35 has a working face 40 formed by the outer surface of the wheel rim or outer wrapper (not shown). The outside diameter of such wheels 32-35 typically vary from about 48 inches to about 74 inches. The cleats 10 are preferably mounted across the working face 40 of each wheel 32-35 along a diagonal from one side of the wheel to the other, with the major axis 23 of the cutting face 17 of each cleat 10 being generally parallel to the axis of rotation 41 of tile wheel 32-35 on which the cleat 10 is mounted.

In one preferred embodiment of a compaction machine according to the present invention (see FIGS. 5 and 6), left hand cleats 13 and right hand cleats 14 are mounted on left side wheels 32, 33 and right side wheels 34, 35, respectively, along generally mirror image diagonals. That is, the cleats 13, 14, when looking at the front wheels 32, 34 as a set and the rear wheels 33, 35 as a set, are mounted on the wheels in each set in general chevron patterns. Preferably, the front and rear chevron patterns point in the forward traveling direction of the machine as indicated by arrow 42. With left and right hand cleats 13, 14 mounted in this pattern, it is believed that waste material under each wheel 32-35 is forced inward toward the center of the compaction machine (See arrows 44) when the machine travels forward and is forced outward (see arrows 45) when the machine is in reverse. By travelling back and forth on its own tracks, this inward and outward movement of the material helps to force out dead air space and thereby increase the density (i.e., the compaction) of the waste material. The previously described demolishing action of the cleats 20 increases the effectiveness of this inward and outward movement. In addition, mounting the cleats 10 in such a chevron pattern provides additional stability to the compaction machine (not shown) as it travels horizontally across a sloping face of, for example, a landfill site (not shown).

In a modification to the previously described embodiment (see Fig. 7), alternating rows of left hand cleats 13 and right hand cleats 14 are mounted to the working face 40 of each wheel 32-35 in the same diagonal pattern as described above to produce basically the same chevron pattern. With the cleats 13, 14 mounted in this manner, is it believed that for each wheel 32-35 the waste material is moved inward and outward, as respectively shown by arrows 54 and 55, in either direction the compaction machine travels.

For a compaction machine (not shown) having wheels 32-35 with outside diameters of approximately 61 inches, dimensions for an exemplary cleat 10, left or right hand, are tabulated below:

| REF. | RADII (inches) | REF. | ANGLES (degrees) | REF. | DISTANCES (inches) |
|---|---|---|---|---|---|
| $R_1$ | 30.5640 | $A_1$ | 20° | $H_1$ | 6.6739 |
| $R_2$ | 0.5094 | $A_2$ | 40° | $H_2$ | 7.0298 |
| $R_3$ | 1.7829 | | | L | 8.7107 |
| $R_4$ | 2.5470 | | | W | 5.0940 |
| $R_5$ | 11.7162 | | | | |
| $R_6$ | 2.5476 | | | | |

Satisfactory cleats 10 have been produced by hot forging blanks (not shown) made of 15B37 steel using well known hot forging techniques. An upper portion of about the top half of each cleat 10 is preferably heat treated to a hardness within the range of about RC 52–58, with the lower balance of each cleat 10 having a hardness within the range of about RC 20–30. The bottom face 22 of each cleat 10 can be mounted to the working face 40 of each of the wheels 32–35 in any acceptable manner. Satisfactory results have been obtained by welding each cleat 10 to its respective working face 40.

From the above disclosure of the general principles of the present invention and the preceding description, those skilled in the art will readily comprehend the various modifications to which the present invention is susceptible. Therefore, the scope of the invention should be limited only by the following claims and equivalents thereof.

What is claimed is:

1. A cleat for being mounted to the working face of a wheel of a compaction machine, said cleat comprising:
    a cutting face having two side edges;
    two ends;
    a bottom face; and
    two side faces, substantially all of the surface area of each of said side faces sloping downward from one side edge of said cutting face toward said bottom face and gradually continuously sloping toward a different respective end of said cleat.

2. The cleat of claim 1 wherein said cutting face has at least two puncture points protruding thereabove.

3. The cleat of claim 1 wherein said bottom face is generally rhomboid shaped.

4. The cleat of claim 1 wherein said cutting face and said bottom face each have a major axis, said major axes being skewed relative to one another.

5. The cleat of claim 4 wherein said major axes are skewed relative to one another by an angle in the range of about 20° to about 25°.

6. The cleat of claim 5 wherein said major axes are skewed relative to one another by an angle about 21°.

7. A compaction machine comprising:
    a vehicle having a plurality of wheels, each of said wheels having a working face mounting a plurality of cleats, each of said cleats comprising:
    a cutting face having two side edges;
    two ends;
    a bottom face; and
    two side faces, substantially all of the surface area of each of said side faces sloping downward from one side edge of said cutting face toward said bottom face and gradually continuously sloping toward a different respective end of said cleat.

8. The compaction machine of claim 7 wherein each of said wheels has a plurality of cleats mounted across its working face in a plurality of diagonal rows.

9. The compaction machine of claim 8 wherein said vehicle has a set of front wheels and a set of rear wheels, the cleats on each set of said wheels being mounted in general chevron patterns.

10. The compaction machine of claim 7 wherein said cleats include first and second cleats which are generally mirror images of each other, said first and second cleats being mounted on the wheels on opposite sides of said vehicle.

11. The compaction machine of claim 7 wherein said cleats include first and second cleats which are generally mirror images of each other, a plurality of said first cleats and said second cleats being mounted on each of the wheels of said vehicle.

12. The compaction machine of claim 11 wherein alternating rows of said first and second cleats are mounted across the working face of each of said wheels in a plurality of diagonal rows.

13. The compaction machine of claim 12 wherein said vehicle has a set of front wheels and a set of rear wheels, the cleats on each set of said wheels being mounted in general chevron patterns.

14. The compaction machine of claim 7 wherein each of said wheels has an axis of rotation and the cutting face of each of said cleats having a major axis, each said major axis being generally parallel to the axis of rotation of its corresponding wheel.

15. A cleat for being mounted to the working face of a wheel of a compaction machine, said cleat comprising:
    a cutting face having two side edges and at least two puncture points protruding thereabove;
    two ends;
    a bottom face; and
    two side faces, each of said side faces sloping downward from one side edge of said cutting face toward said bottom face and generally toward one end of said cleat.

16. A cleat for being mounted to a working face of a wheel of a compaction machine, said cleat comprising:
    a cutting face having two side edges and a first major axis;
    two ends;
    a bottom face having a second major axis; and
    two side faces, each of said side faces sloping downward from one side edge of said cutting face toward said bottom face and generally toward one end of said cleat,
    said major axes being skewed relative to one another by an angle in the range of about 20° to about 25°.

17. The cleat of claim 16 wherein said major axes are skewed relative to one another by an angle of about 21°.

* * * * *